(12) United States Patent
Hölle

(10) Patent No.: US 11,975,752 B2
(45) Date of Patent: *May 7, 2024

(54) SUPPORT ROLLER, VEHICLE WITH A SUPPORT ROLLER AND METHOD FOR STABILIZING A VEHICLE

(71) Applicant: BLICKLE RÄDER + ROLLEN GMBH U. CO. KG, Rosenfeld (DE)

(72) Inventor: Rolf Hölle, Rosenfeld (DE)

(73) Assignee: BLICKLE RÄDER + ROLLEN GMBH U. CO. KG, Rosenfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,433

(22) Filed: Jun. 30, 2022

(65) Prior Publication Data

US 2022/0332357 A1     Oct. 20, 2022

Related U.S. Application Data

(63) Continuation of application No. 16/315,568, filed as application No. PCT/EP2017/067038 on Jul. 6, 2017, now Pat. No. 11,420,666.

(30) Foreign Application Priority Data

Jul. 7, 2016 (DE) ............. 10 2016 112 511.3

(51) Int. Cl.
*B62B 3/065* (2006.01)
*B62B 3/00* (2006.01)
(Continued)

(52) U.S. Cl.
CPC ............ *B62B 3/0618* (2013.01); *B62B 3/001* (2013.01); *B62B 5/04* (2013.01); *B66F 9/07586* (2013.01);
(Continued)

(58) Field of Classification Search
CPC . B66F 9/07586; B62B 3/0618; B62B 3/0612; B62B 3/0606; B62B 3/06;
(Continued)

(56) References Cited

U.S. PATENT DOCUMENTS

| | | | | |
|---|---|---|---|---|
| 5,628,377 A | * | 5/1997 | Le Gloan | ............... B60G 11/50 280/124.152 |
| 7,770,904 B2 | * | 8/2010 | Passeri | .................. B62B 3/0612 280/43.12 |
| 2016/0340162 A1 | * | 11/2016 | Standard | ................... B62B 5/00 |

FOREIGN PATENT DOCUMENTS

| | | |
|---|---|---|
| CN | 101585500 | 6/2009 |
| CN | 102689863 | 9/2012 |

(Continued)

*Primary Examiner* — John D Walters
(74) *Attorney, Agent, or Firm* — Jones Day

(57) ABSTRACT

A support roller (30, 30') for supporting a vehicle on an underlying surface, comprising at least one bearing element which is at least indirectly connectable to at least one supporting structure of the vehicle, at least one fork connected to the bearing element, and at least one wheel (90, 90') which is mounted in the fork so as to be rotatable about a first rolling axis (R) and can be brought into contact with the underlying surface, at least one sensing device (190) for sensing at least one supporting force with which the wheel (90, 90') is supported on the underlying surface. A vehicle, in particular an industrial truck, comprising at least one support roller and a method for stabilizing a vehicle.

34 Claims, 4 Drawing Sheets

(51) Int. Cl.
*B62B 3/06* (2006.01)
*B62B 5/04* (2006.01)
*B66F 9/075* (2006.01)

(52) U.S. Cl.
CPC ....... *B62B 2301/10* (2013.01); *B62B 2301/23* (2013.01)

(58) Field of Classification Search
CPC ....... B62B 3/001; B62B 5/04; B62B 2301/10; B62B 2301/23; B62B 2301/20
See application file for complete search history.

(56) References Cited

FOREIGN PATENT DOCUMENTS

| | | |
|---|---|---|
| DE | 19753412 | 2/1997 |
| DE | 202015103436 | 10/2016 |
| EP | 0329504 B1 | 8/1989 |
| EP | 0465838 A1 | 1/1992 |
| EP | 2354078 A1 | 8/2011 |
| EP | 2500237 A2 | 9/2012 |
| JP | 2004010292 | 1/2004 |
| JP | 2006089214 | 1/2004 |
| JP | 200401092 | 1/2015 |

\* cited by examiner

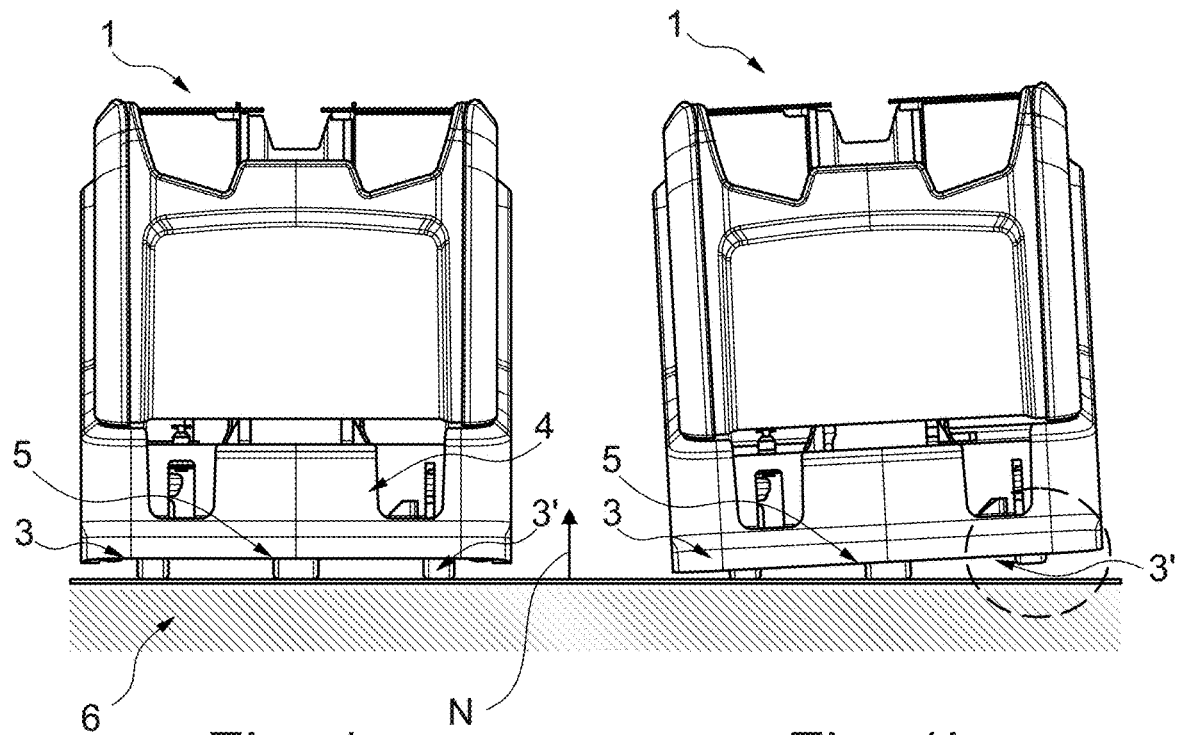
Fig. 1a
Prior art
Fig. 1b
Prior art
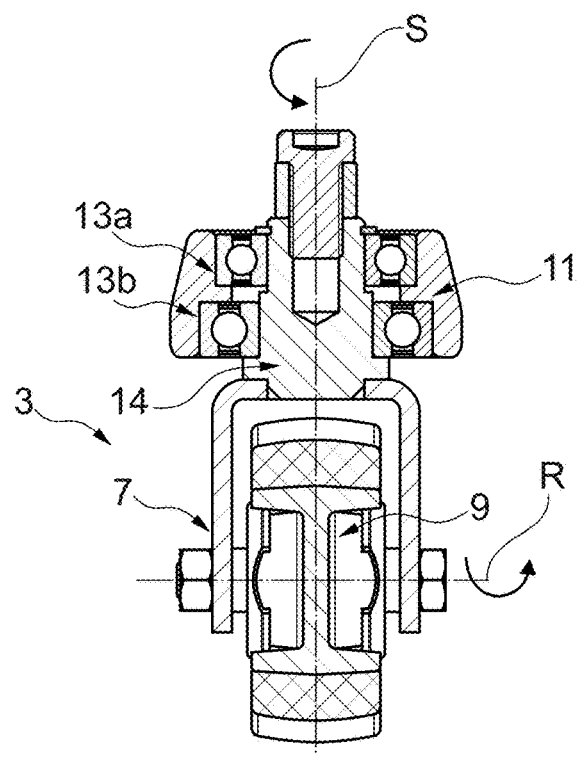
Fig. 2
Prior art

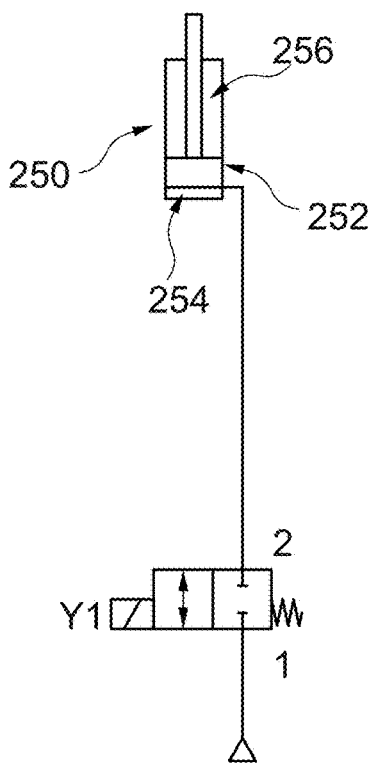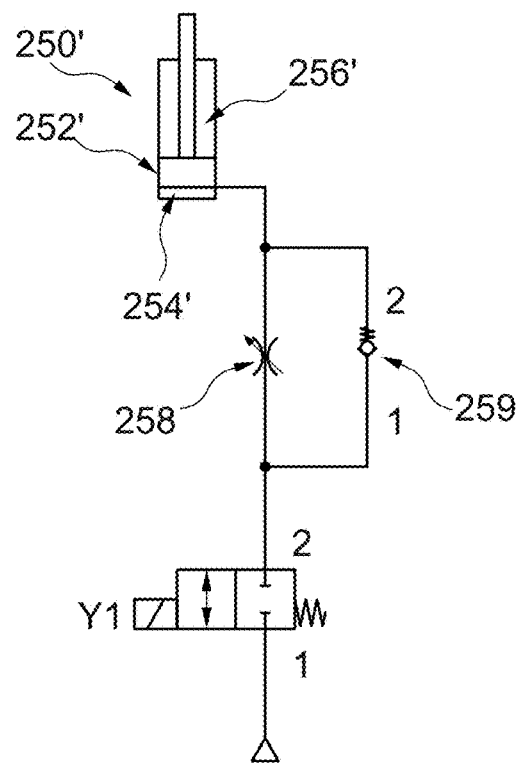
Fig. 5a    Fig. 5b
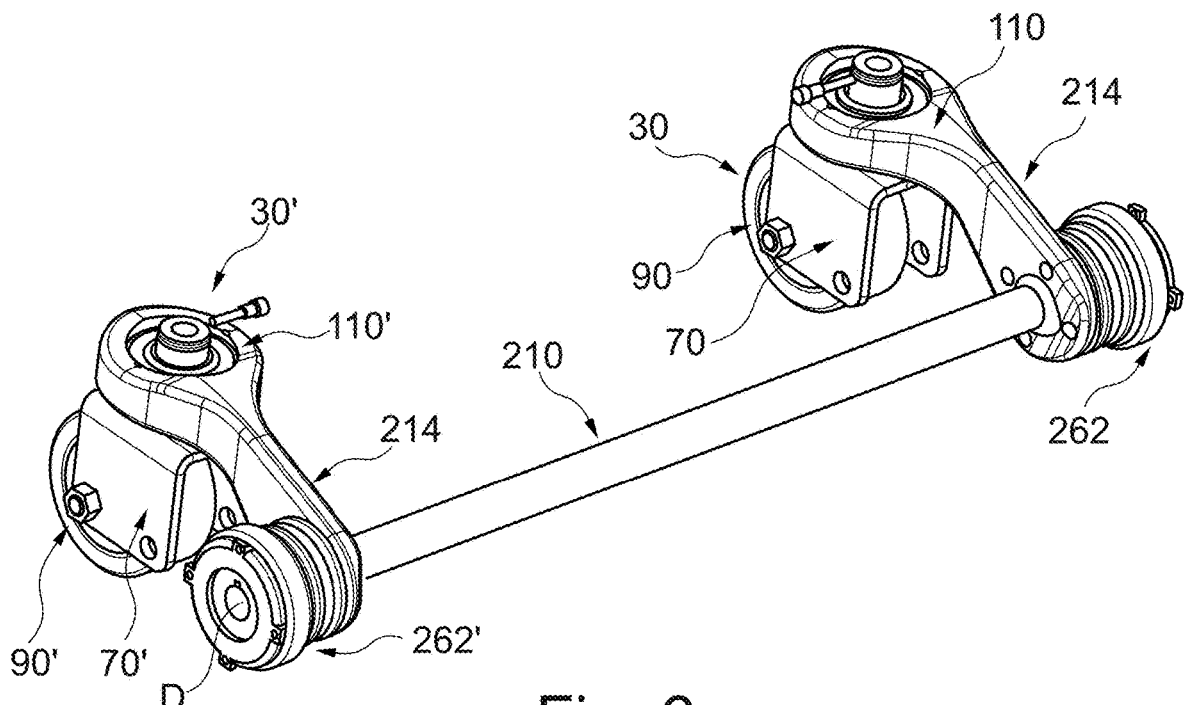
Fig. 6

SUPPORT ROLLER, VEHICLE WITH A SUPPORT ROLLER AND METHOD FOR STABILIZING A VEHICLE

CROSS REFERENCE TO RELATED APPLICATIONS

This application is a continuation of U.S. patent application Ser. No. 16/315,568, filed Jan. 4, 2019, which is the National Phase application of International Application No. PCT/EP2017/067038, filed Jul. 7, 2017, which designates the United States, and further claims priority to German Application No. 10 2016 112 511.3, filed Jul. 7, 2016. The foregoing applications, in their entirety, are incorporated herein by reference.

DESCRIPTION

The present invention relates to a support roller for supporting a vehicle on an underlying surface, comprising at least one bearing element connectible at least indirectly to at least one supporting structure of the vehicle, at least one fork connected to the bearing element and at least one wheel mounted in the fork so as to be rotatable about a first rolling axis and be brought into contact with the underlying surface. The present invention also relates to a vehicle with such a support roller and a method for stabilizing a vehicle.

A wide variety of vehicles for transporting loads are known from the prior art. For example, industrial trucks with rollers run on an underlying surface, floor or open surface, can be steered and are mostly used for internal transport. Depending on the individual design, industrial trucks can also be used for lifting and stacking loads. A well-known design uses a five-wheel chassis, where a drive wheel drives the industrial truck and support rollers ensure the stability of the industrial truck. The main purpose of these support rollers is to give the industrial truck lateral stability against tipping over. The risk of tipping over exists, for example, when cornering tightly and simultaneously lifting and transporting loads, wherein the center of gravity of the industrial truck is unfavorably shifted in the direction of the load from the underlying surface on which the industrial truck is moved. The use of a spring-loaded axle rotatable about a rotary axis, a so-called coupling rocker, at the end-areas of which support rollers are arranged, is known from prior art as a stabilization element for limiting the lateral inclination. For example, the DE 20 2015 103 436.9,which was not previously published, describes such a coupling rocker. The object of the coupling rocker is to distribute the supporting force evenly over the support rollers according to the driving situation.

However, the solutions known from the prior art have the disadvantage that when the vehicle tilts to one side, the coupling rocker moves upwards in the opposite direction to the underlying surface or is rotated, so that the entire spring force of the coupling rocker acts only on one support roller, wherein the other support roller on the coupling rocker is relieved accordingly and held at a distance from the underlying surface.

The object of the present invention is therefore to provide a support roller which, when used in a vehicle, in particular an industrial truck, enables increased stability to be achieved so as to overcome the disadvantages of the prior art, in particular to prevent excessive tilting of the industrial truck and thus reduce the risk of tipping over.

This object is solved according to the invention by at least one sensing device to detect at least one supporting force with which the wheel rests on the underlying surface.

It may be provided that the rolling axis is perpendicular to a normal direction of the underlying surface and/or that the supporting structure is formed at least in certain areas by a part of the vehicle body.

It is further proposed that the bearing element is formed in the form of at least one rotary bearing and that a rotation of the fork about a pivot axis running substantially perpendicularly to the rolling axis is possible by means of the rotary bearing, wherein in particular the rolling axis and the pivot axis intersect or run obliquely relative to one another and/or the fork and/or the rolling axis can be forced by means of at least one first return device into at least one predetermined position relative to the bearing element and/or the supporting structure, preferably with regard to the pivot axis.

It is also preferable that a movement of at least one first element relative to at least one second element is detectable by means of the sensing device, preferably that a, in particular linear, movement in a first direction running perpendicularly to the rolling axis and/or parallel to the pivot axis, and/or a force acting by means of the sensing device between the first element and the second element, in particular a tensile force, a compressive force and/or shear force, is detectable.

In the aforementioned embodiment, it is particularly preferred that the first element is selected from the group comprising the roller, a bearing axle of the roller mounted in the fork, the fork, at least one connecting means of the fork to the bearing element, such as a pin, and the bearing element, and/or the second element is selected from the group comprising the bearing axle, the fork, the connecting means, the bearing element and the supporting structure.

It is also proposed for the two aforementioned embodiments that the second element, in particular the bearing element, is adapted to keep the first element, in particular the fork, movable along the first direction, preferably the second element is adapted to allow a movement of the first element of up to 5 mm, in particular of 3 mm, preferably relative to the second element.

Furthermore, an inventive support roller can be characterized in that the first element, in particular the fork and/or the connecting means, can be forced into a first position, in particular in a direction towards the second element, by means of at least one second return device.

It is also preferred that the first return device and/or the second return device comprises at least one elastic means, at least one compression spring, at least one helical spring, at least one pneumatic spring, at least one hydraulic spring and/or at least one gas pressure spring.

Preferred embodiments of the invention provide for the sensing device to be arranged at least in certain areas in the bearing element and/or on the side of the bearing element, preferably the pivot bearing, facing away from the fork and/or the wheel.

An inventive support roller can also be characterized by at least one position recognition device by means of which an alignment of the fork, the bearing axis and/or the wheel about the pivot axis and/or relative to the underlying surface is determinable.

An inventive support roller can finally be characterized in that the sensing device and/or the position recognition device comprises and/or comprise at least one sensor means, in particular comprising at least one limit switch, at least one strain gauge sensor, at least one pressure sensor, at least one Hall sensor, at least one radar sensor, at least one ultrasonic sensor, at least one distance sensor, at least one echo sounder sensor, at least one acoustic sensor, at least one optical sensor, at least one electromagnetic sensor, and/or at least one magnetic sensor, or and/or the first position and/or at least a second position of the first element relative to the second element is detectable by means of the sensing device.

Furthermore, the invention provides a vehicle, in particular an industrial truck, comprising at least one inventive support roller.

In this case, the invention suggests that the vehicle further comprises at least one coupling rocker, the coupling rocker being arranged mechanically between the supporting structure and the support roller, and the coupling rocker having at least one rocker which is mounted rotatably about at least one rotary axis and a lever which is operatively connected to the rocker, wherein the support roller, in particular the bearing element, is supported at the end of the lever facing away from the pivot axis and/or the rocker, wherein furthermore the lever is preferably surrounded by the rocker and/or is formed integrally with the rocker at least in certain areas.

Here it is particularly preferred that the coupling rocker comprises at least one third return device by means of which the rocker and/or the lever is/are forceable into at least one third position, wherein the third return device preferably comprises at least one torsion spring, at least one helical spring, at least one tension spring, at least one thrust spring, at least one shear spring, at least one rubber-elastic element, at least one spiral spring and/or at least one gas pressure spring.

In the two aforementioned embodiments, it is particularly preferred that the coupling rocker comprises at least one shock absorbing device, wherein a movement, in particular of the lever, the support roller and/or the rocker about the rotary axis can be cushioned by means of the shock absorbing device.

Furthermore, an inventive vehicle can be characterized by at least one control member, which is in particular in operative connection with the shock absorbing device, wherein a movement, in particular of the lever, the support roller and/or the rocker, about the rotary axis by means of the control member is reducible, preferably suppressible, wherein the control member is preferably at least in certain areas enclosed by the shock absorbing device.

It is also proposed with the invention that the shock absorbing device and/or the control member comprises at least one cylinder, in particular a hydraulic cylinder, with at least one piston movable within the cylinder, the cylinder being operatively connected to the lever, the support roller, in particular the bearing element, and/or the rocker, preferably via a connecting element extending at least in a radial direction with respect to the rotary axis, and the piston being operatively connected to the supporting structure or the piston being operatively connected to the lever, the rocker, the support roller, the bearing element and/or the connecting element and the cylinder being operatively connected to the supporting structure.

In the aforementioned embodiment, it is particularly preferable that the control member comprises at least one control element, wherein the control element preferably comprises at least one control valve and/or, by means of closing the control element, a movement of the shock absorbing device and/or of the control member and/or a movement, in particular of the rocker, of the lever and/or of the support roller, about the rotary axis is prevented and, when the control element is opened, a movement of the shock absorbing device and/or of the control member and/or a movement, in particular of the rocker, of the lever and/or of the support roller, about the rotary axis is released.

Furthermore, the invention proposes that an inventive vehicle is characterized in that the cylinder preferably comprises a single-acting cylinder and the control element comprises a throttle element adapted to control the flow rate of at least one fluid, preferably a hydraulic fluid, a gas and/or air into the cylinder, preferably to allow shock absorbing, preferably the control element being adapted to control the throttle element as a function of the supporting force detected by the sensing device in order to increase the fluid pressure in order to avoid a reduction of the supporting force below a predetermined value.

The invention also proposes that the cylinder, in particular the hydraulic cylinder, comprises at least two-cylinder chambers connectible to each other via at least one throttle, the fluid being movable in particular between the cylinder chambers, in particular by movement of the piston.

Furthermore, the invention proposes that the control member comprises at least one braking means, in particular an electromagnetic brake, a mechanical brake, an adhesive and/or positive brake, the braking means being operatively connected, preferably on the one hand, to the rocker and/or to the support roller and/or, on the other hand, to the supporting structure.

In the aforementioned embodiment it is particularly preferred that the braking means is arranged, at least in certain areas, preferably circularly revolving around the rotary axis of the coupling rocker.

The invention further proposes that at least one control device operatively connected to the control member and/or the shock absorbing device, the control device comprising at least one power supply, in particular an electrical voltage supply and/or a device for storing and/or emitting mechanical energy, of the braking means, and wherein when energy is emitted from the control device to the control member a movement of the shock absorbing device and/or of the control member and/or a movement, in particular of the rocker and/or of the support roller, about the rotary axis is prevented, and when the emission of energy is interrupted a movement of the shock absorbing device and/or of the control member and/or a movement, in particular of the rocker and/or of the support roller, about the rotary axis is enabled.

Furthermore, the invention suggests that an inventive vehicle is characterized by at least one control device operatively connected to the sensing device, the position recognition device, the control device and/or the control member, preferably the control element, wherein the control member can preferably be influenced by means of the control device in such a way that the movement about the rotary axis is reduced, is preferably prevented when, by means of the sensing device, a supporting force is sensed which corresponds to a missing contact between the support roller and the underlying surface and/or the movement about the rotary axis is at least partially released when, by means of the sensing device, a supporting force is sensed which corresponds to an existing contact between the support roller and the underlying surface.

In the aforementioned embodiment, it is particularly preferred that the control device influences the control member as a function of a position of at least one lifting fork of the vehicle, in particular relative to the underlying surface, a speed of the vehicle and/or a steering angle of the vehicle.

Furthermore, the invention proposes that the control member comprises at least one pump means for increasing a fluid pressure in the cylinder, in particular the cylinder chambers, preferably the control device being adapted to control the pump means as a function of the supporting force detected by the sensing device in order to increase the fluid pressure in order to avoid a reduction of the supporting force below a predetermined value.

Particularly preferred embodiments of the vehicle may be characterized by a plurality of support rollers according to any of claims 1 to 11, wherein the coupling rocker preferably comprises a plurality of levers, preferably arranged on the rocker, surrounded by the rocker and/or at least in certain areas integrally formed with the rocker.

Finally, it is proposed for the inventive vehicle that the vehicle is formed as an industrial truck and/or as a pallet truck with at least one drive wheel, in particular a pallet truck with five-wheel chassis.

Finally, the invention provides a method for stabilizing a vehicle, in particular an inventive vehicle, with a coupling rocker and at least one support roller, in particular an inventive support roller, comprising the following steps: recognizing a supporting force with which the support roller is supported on an underlying surface, the support roller being in contact with the underlying surface in the case of at least one first supporting force, and the support roller being in no contact with the underlying surface in the case of at least one second supporting force; and control of a control member as a function of the recognized supporting force, a rotation of the coupling rocker and/or of the support roller about a rotary axis being at least partially prevented by means of the control member when the second supporting force is recognized.

The invention also proposes for the method that, when the first supporting force is recognized, a movement about the rotary axis is cushioned by means of at least one shock absorbing device.

In the case of the two aforementioned embodiments, it is particularly preferred that the cushioning and suppression of the movement about the rotary axis is carried out by means of a device which at least in part comprises the control member and the shock absorbing device, in particular the shock absorbing device and the control member are at least in part formed integrally.

Finally, it is proposed for the method that the suppression of the movement about the rotary axis is achieved by suppressing a movement of the shock absorbing device and/or at least a third return device.

The term "body part" or "supporting structure" can also be used to describe an attachment to a component of the vehicle.

The invention is therefore based on the surprising realization that by providing a support roller which makes it possible to determine a supporting force with which a wheel of the support roller is supported on an underlying surface, the stability of a vehicle in which the support roller is installed can be increased by limiting an inclination of the vehicle, in particular of an industrial truck.

This means that an inclination of the vehicle can be proactively counteracted before the inclination becomes so critical that the vehicle could fall over. This effect is achieved in particular by combining the inventive support roller with a coupling rocker and limiting a rotary movement of the coupling rocker around a rotary axis when the support roller lifts off from the underlying surface. This is sensed by detecting a supporting force below a threshold value by means of the inventive sensing device, so that a lift-off of the support roller from the underlying surface can be inferred. This limitation of the rotary movement of the coupling rocker can be achieved in particular by changing the behavior of a shock absorbing device. It is also conceivable that a control member is used which limits the rotary movement of the coupling rocker, for example by using mechanical locking in at least one predetermined position, preferably a plurality of positions, of the coupling rocker about the rotary axis. This effect of limiting or blocking the rotary motion of the coupling rocker about the rotary axis is preferably achieved by a cylinder linkage on the coupling rocker, whereby the inclination of the vehicle can be limited.

Within the meaning of the invention, the term "underlying surface" is used to refer in particular to the floor on which the support roller is supported or on which the vehicle is moved. The term "the support roller has no contact with the underlying surface" can therefore be used to define that the support roller is free in the air and that the industrial truck does not exert a support load on the support roller. This position of the support roller is detected by the sensing device detecting that the supporting force is below a predetermined threshold. Contact with the underlying surface occurs when the sensed supporting force exceeds a predetermined threshold value. The term "cushioning movement about the rotary axis" is used in particular to describe a cushioned up- and down-movement of the coupling rocker or a suspension of the coupling rocker. The term "arranged in a spring-loaded manner" can be used according to the invention to define that the coupling arm is arranged on a load-bearing body part in such a way that it is movable or spring-loaded at least in the vertical direction. The spring bearing can be achieved by a spring-loaded suspension of the coupling rocker and/or by the hydraulic cylinder or an additional return device, such as a torsion spring.

Recognizing whether the vehicle is neutral or inclined can be carried out simply by detecting the underlying surface contact of the support rollers by sensing the supporting force.

According to the invention, the support roller can be a fixed roller. With such a fixed roller, the bearing element is configured in such a way that a rotation of the fork or wheel about the pivot axis relative to the bearing element is prevented. Alternatively, the support roller can also be formed as a free-rotating support roller, in which the bearing element then has the shape of a pivot bearing and allows the fork or wheel to rotate about the pivot axis. The support roller can also be formed as a positively steered roller. This means that a position of the fork or the wheel around the pivot axis can be controlled or regulated by means of an actuator device. The inventive support roller can generally also be freely pivoted, but can be forced into at least one predetermined position, for example a straight extension position of the vehicle, by means of a first return device, in particular a spiral spring. In particular, if the support roller is in contact with the underlying surface, it will be forced in the driving direction against the force of the first return device. If, however, the support roller loses contact with the underlying surface, it pivots by means of the first return device to the neutral position. This movement can be detected via the sensing device and the missing supporting force can be inferred.

The supporting force is preferably measured indirectly by means of the sensing device. It can be provided that the fork is mounted so that it can move relative to the bearing element, but is forced into a predetermined position by means of a second return device. If the fork then moves relative to the bearing element, this movement takes place against the force built up by the second return device. Determining relative movement between the fork and the bearing element can then be inferred from the force acting on the support roller. In particular, the second return device causes the fork to be forced against the bearing element when the support roller is not in contact with the underlying surface and when the fork is moved relative to the bearing element against the force built up by the second return device.

However, the mechanism described above is not limited to a movement of the fork relative to the bearing element, but essentially any relative movement between individual components of the support roller can be used to determine the supporting force. In addition to or as an alternative to the mechanism described above, a supporting force can also be indirectly determined by determining the orientation of the fork about the pivot axis using a position recognition device. If this alignment changes continuously, it can be assumed that there is an increased supporting force and that the support roller is in contact with the underlying surface. This applies in particular if the fork is forced into a predetermined position by the first return device. If the support roller is deflected from the predetermined position, there is contact with the underlying surface and a correspondingly predominant supporting force can be inferred. A hydraulic cylinder can be provided as a shock absorbing device, which at the same time acts as a control element. This hydraulic cylinder is preferably connected to the coupling rocker, in particular the rocker, by means of a lever and is also supported by the supporting structure. If there is a movement of the coupling rocker or rocker around the rotary axis, this movement is cushioned by means of the hydraulic cylinder. The shock absorbing device itself may constitute a third return device by means of which the coupling rocker is forced into a third position, but it may also be provided that a separate third return device, in particular a torsion spring, is provided in order to achieve this function. The use of a hydraulic cylinder offers the advantage that the control element itself can also be formed by this device. In such a hydraulic cylinder, cushioning is usually achieved by passing a fluid from one-cylinder chamber to another cylinder chamber via a throttle during a movement of the piston inside the cylinder. The throttle can now be formed as a controllable valve, so that a flow of the fluid from one-cylinder chamber to the other is prevented, thus completely blocking the hydraulic cylinders from the movement of the coupling rocker around the rotary axis. This locking prevents further rotation of the coupling rocker, which could allow the support roller, which is in ground contact, to plunge deeper and cause the vehicle to tip over. Other parameters in addition to the supporting force can also be included in the control of the control member.

Additional parameters, such as the position of the fork of the industrial truck, the speed and/or the steering angle, can also be included in the calculation of whether the movement of the coupling rocker around the rotary axis should be blocked, in order to achieve the highest possible level of safety with good driving characteristics at the same time In one embodiment, the use of a throttle element and/or pumping medium to increase the fluid pressure can also be advantageously used to counteract a tipping over of the vehicle. By increasing the pressure within the cylinder chambers, a movement of the coupling rocker is counteracted by a higher counterforce.

Further features and advantages of the invention result from the following description, in which preferred embodiments of the invention are explained by means of schematic drawings. The following applies:

FIG. 1a, 1b are schematic front views of a prior art industrial truck in a neutral and inclined vehicle position;

FIG. 2 is a schematic cross-sectional view of a support roller known from prior art;

FIG. 5a, 5b are hydraulic circuit diagrams for controlling the hydraulic cylinder according to embodiments of the invention;

FIG. 6 is a schematic view of a coupling rocker with a first and a second support roller and a braking means according to an embodiment of the invention;

Figures 3A, 3B:
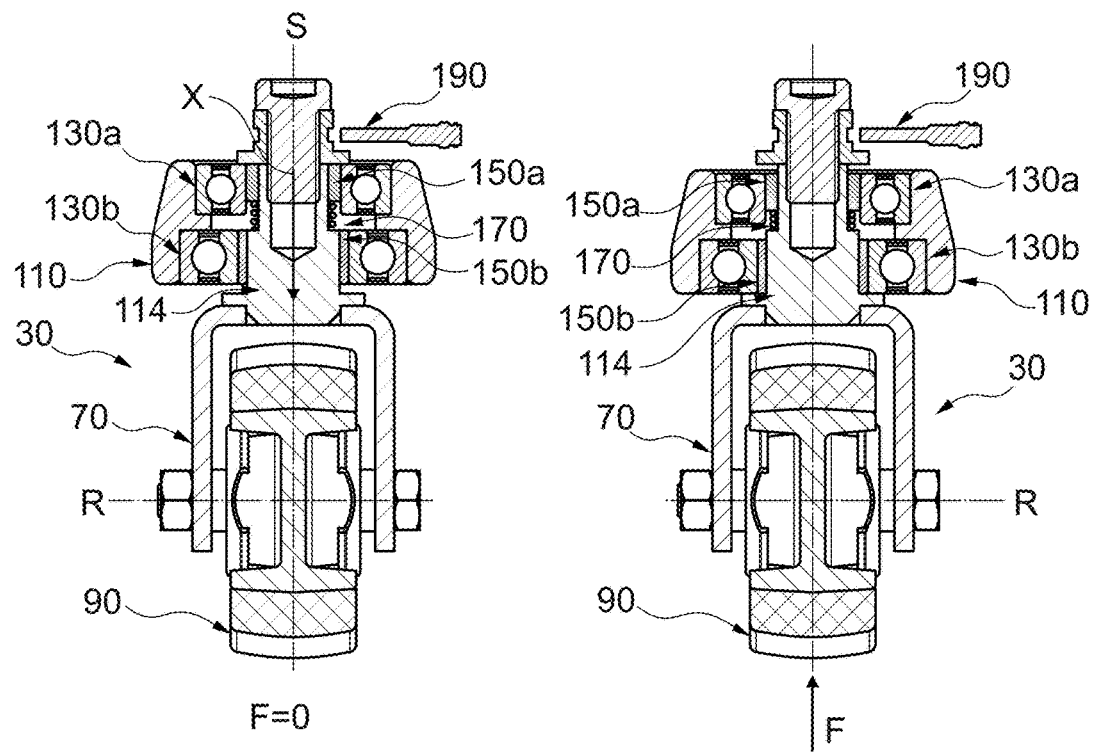
FIG. 3a, 3b are schematic cross-sectional views of a support roller according to an embodiment of the invention in an unloaded and a loaded state.

FIG. 1a shows a schematic front view of a vehicle in the form of an industrial truck I known from prior art. The industrial truck I shown as an example is a pallet truck with a five-wheel chassis, wherein in FIG. 1a only the first and second support rollers 3, 3' and the drive wheel 5, each connected to a supporting structure 4 of the industrial truck I, are shown. On the industrial truck I shown in FIG. 1a, the drive wheel 5 is essentially centered between the first and second support rollers 3, 3'. The first and second support rollers 3, 3' are attached to a coupling rocker (not shown) and are connected to each other by this coupling rocker. In the prior art the coupling rocker is usually attached to the support structure of the industrial truck 1 with spring bearings and has the object of distributing the supporting force evenly between the first and second support rollers 3, 3' according to the driving situation.

FIG. 1b shows a schematic view of the industrial truck 1 shown in FIG. 1a in an inclined position. Industrial truck 1 can, for example, incline accordingly when cornering tightly with loads held in a high position. If the industrial truck 1 tilts to the side, the coupling rocker is rotated about a rotary axis and the entire spring force of the coupling rocker acts on the first support roller 3 in the example shown. The second support roller 3' is relieved accordingly and loses contact with an underlying surface 6 on which the industrial truck 1 is moved (shown in FIG. 1b with a dashed border). If the industrial truck 1 tilts further at this point, and if in particular the support roller 3' moves further in the normal direction N of the underlying surface 6, there is a risk of tipping over. In this situation shown in FIG. 1b, the supporting force with which the support roller 3' is supported on the underlying surface 6 is below a first threshold value, since the support roller 3' does not touch the underlying surface 6, i.e. the support roller 3' is free in the air.

On the other hand, the supporting force of the support roller 3 is above a threshold value because the support roller 3 is in contact with the underlying surface 6.

FIG. 2 shows a schematic cross-sectional view of a support roller 3 known from prior art. The support roller 3 comprises a fork which is intended to house a wheel 9. Wheel 9 is held in the fork so that it can rotate about a rolling axis R. By means of a bearing formed as a rotary bearing 11 the fork formed as a steering fork 7 can be held with a wheel on the supporting structure of the industrial truck (not shown) by means of the coupling rocker (not shown) so that it can rotate about a pivot axis S around its own axis. In the support roller 3 shown, two ball bearings 13a, 13b are arranged around the pin 14 of the fork 7 for this purpose. Wheel 9 is attached to the coupling rocker (not shown) via the rotary bearing 11, so that wheel 9 can steer too when cornering.

FIG. 3a shows a schematic cross-sectional view of a support roller according to an embodiment of the invention in an unloaded state. This means that the supporting force is below the first threshold value, i.e. the support roller 30 in particular is not in contact with the underlying surface. As shown in FIG. 3a, many features of the support roller 30 correspond to the features of the support roller of the prior art shown in FIG. 2. In contrast to the support roller of the prior art, in the embodiment shown the wheel 90 is not only rotatable about the pivot axis S via the steering fork 70 but is also arranged in the rotary bearing 110 along the first direction X, i.e. axially movable to the pivot axis S. In order to achieve improved tracking accuracy, the steering fork 70 can be pulled into a predetermined position around the pivot axis S by means of an unrepresented first return device. For this purpose, in the embodiment shown, plain bearings 150a and 150b are pressed between the ball bearings 130a and 130b and the pin 114 of the steering fork 70. The plain bearing bushes 150a, 150b allow this movement of the wheel 90 along the direction X. FIG. 3a further shows that a second return device, which is formed as an elastic means 170 in the shape of a spring, is arranged at a sliding bush 150 in order to keep the wheel 90 in an unloaded state vertically pushed out relative to the rotary bearing 110. The person skilled in the art knows, however, that the displacement can also be effected by means of other return devices, e.g. a rubber spring.

FIG. 3a shows the first direction X by means of an arrow. In this context, the term "unloaded state" can be used to describe a position in which no significant supporting force acts vertically on the wheel 90. For example, this position is assumed when the support roller 30 no longer makes contact with the underlying surface due to an inclination of the industrial truck.

FIG. 3a also schematically shows a sensing device 190, which, for example, can detect the position of the steering fork 70 along the first direction X relative to the rotary bearing 110 as a limit switch. In other embodiments not shown, however, the act of recognizing can be carried out alternatively or in addition to the embodiment shown contact less by means of a Hall sensor and/or a radar sensor.

FIG. 3b shows a schematic cross-sectional view of the support roller 30 shown in FIG. 3a in a loaded state. This loaded state can for example be assumed if the support roller 30 has contact with the underlying surface. For example, when the weight of the industrial truck (not shown) exerts an axial force on the support roller 30 and the support roller 30 rests on the underlying surface with a supporting force above the second threshold. Between the two positions shown in FIGS. 3a and 3b, there is a distance of approx. 3 mm of the steering fork 70 relative to the rotary bearing 110. However, the person skilled in the art knows that shorter or longer distances can also be covered. The changed position can then be detected via the sensing device 190. It is important to note here that the movement in the X direction takes place against the force generated by the elastic means 170, i.e. the second return device, so that the supporting force acting on the support roller 30 can be inferred from the position. When the supporting force is removed again, the support roller 30 can return to the unloaded state shown in FIG. 1.

Figure 4:
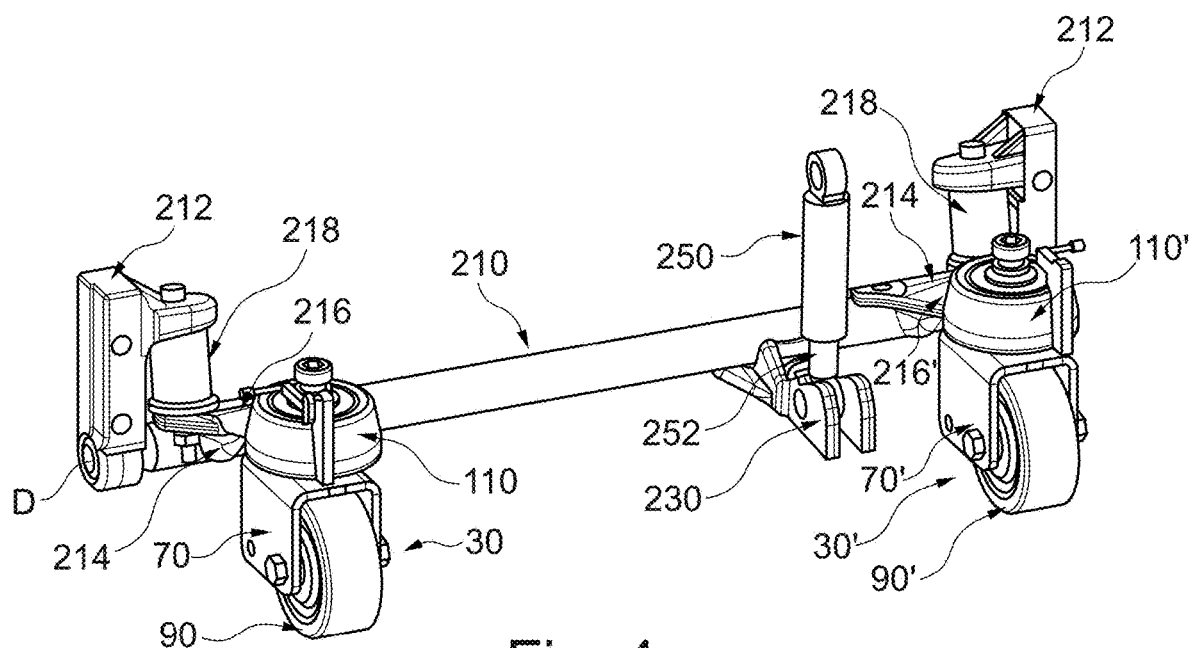
FIG. 4 is a schematic view of a coupling rocker with a first and a second support roller and a hydraulic cylinder according to an embodiment of the invention.

FIG. 4 shows a schematic view of a coupling rocker 210 with a first and second support roller 30, 30'. The coupling rocker 210 is mechanically arranged between the support rollers 30, 30' and a bearing 212 of the vehicle's supporting structure. The coupling rocker 210 comprises a 214 rocker on which levers 216,216' are mounted. Bearings 212 are supported by levers 216,216'. The rocker 214 is mounted in bearing 212 so that it can rotate together with the levers 216, 216' around a rotary axis D. This rotation is carried out against the force of a third return device 218 in the form of a rubber-elastic compression spring.

The coupling rocker 210 further comprises a shock absorbing device in the form of a 250 hydraulic cylinder. A piston 252 of the hydraulic cylinder 250 is supported by means of a connecting element 230 on the rocker 214. The housing of the hydraulic cylinder 250 is supported by the supporting structure of the vehicle.

In accordance with the invention, i.e. by means of the third return device, the coupling rocker 210 is arranged in a spring-loaded way on the supporting structure of the vehicle. In the embodiment shown, a first and a second support roller 30, 30' are arranged at opposite end areas of the coupling rocker 210. In the embodiment shown, the support rollers with sensing device shown in FIGS. 3a and 3b can be used. However, the person skilled in the art knows that other embodiments may also be used, such as support rollers with pressure sensors in the wheels, and/or support rollers comprising Hall sensors, and/or radar sensors for sensing the supporting force, at least indirectly by measuring a movement along the first direction.

The hydraulic cylinder 250 fulfils both the function of the shock absorbing device and the function of the control member. For this purpose, a throttle in the form of a control-less hydraulic valve is arranged in the hydraulic cylinder. The movement of the fluid within the hydraulic cylinder 250 from a cylinder chamber above the piston to the cylinder chamber below the piston can be controlled via the hydraulic valve so that in a closed state of the hydraulic valve the movement of the hydraulic cylinder 250 is blocked in order to block a vertical movement, in particular a suspension, of the coupling rocker 210 and the first and second support rollers 30, 30' arranged thereon, and in an open position to release the movement of the hydraulic cylinder 250 in order to enable the vertical movement, in particular suspension, of the coupling rocker 210 and the first and second support rollers 30, 30' arranged thereon. The opening of the valve remains so that the throttling function is maintained, and cushioning is thus ensured.

FIGS. 5a, 5b show hydraulic circuit diagrams for controlling the hydraulic cylinders 250, 250' according to the embodiments of the invention.

Figure 7:
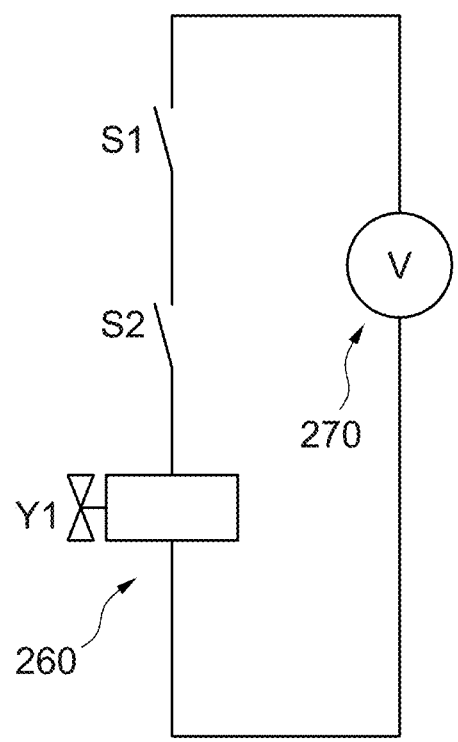
FIG. 7 is a circuit diagram for the electrical control of the hydraulic valve according to embodiments the invention.

In the hydraulic circuit diagram shown in FIG. 5a, the hydraulic cylinder 250, shown as a single- acting hydraulic cylinder, is controlled by means of the hydraulic valve Y1. In the embodiment shown there is no connection between the cylinder chambers 254 and 256. In the closed position the hydraulic valve Y1 blocks the movement of the piston 250. However, if hydraulic valve Y1is in an open position, the movement of piston 252 is released. As shown in FIG. 7, hydraulic valve Y1can be electrically operated, i.e. electrically closed or opened, by means of a control device 260.

In an embodiment not shown, there may be a connection between the cylinder chambers so that the movement or resilience of the coupling rocker in the open position can be enabled so that the hydraulic cylinder can perform the functions of the control member. By installing a throttle in the connection between the cylinder chambers, the function of the shock absorbing device can also be realized.

The embodiment shown in FIG. 5b can essentially have the structure of the embodiment shown in FIG. 5a. In the embodiment shown, the hydraulic cylinder 250', which is shown as a single-acting hydraulic cylinder, is controlled via a throttle element 258 by means of the hydraulic valve Y1. The throttle element 258 enables the flow rate of the fluid to be controlled, thus enabling a particularly cushioned movement when the hydraulic valve Y1 is open. In the embodiment shown in FIG. 5b, an inclination can be actively counteracted by increasing or decreasing the fluid pressure in the hydraulic cylinder 250'. This can be supported by a pump medium. FIG. 5b also shows a non-return valve 259 parallel to the throttle element 258. This non-return valve 259 can be used to cushion a retracting movement of the cylinder without cushioning an extension movement in the opposite direction. This allows the extension movement to take place more quickly.

In the embodiment shown, the cylinders can be extended by increasing the fluid pressure and retracted when the pressure is reduced, in order to additionally counteract a tipping over. By increasing the pressure, it is possible to counteract a movement of the coupling rocker with a higher counterforce.

FIG. 6 is a schematic view of a coupling rocker 210 with a first and a second support roller 30, 30' and a braking means 262 according to an embodiment of the invention.

The support rollers 30, 30' and the fastening of the support rollers 30, 30' of the embodiment of the coupling rocker 210' shown in FIG. 6 can essentially correspond to the embodiment shown in FIG. 4. However, the 210' coupling rocker shown in FIG. 6 comprises a braking means 262 realized as an electromagnetic brake acting as a control member and/or shock absorbing device. In the embodiment shown, the braking means 262 can be arranged around the rotary axis D and can also be fixed to the supporting structure of the vehicle by means of a holding device (not shown).

In particular, in addition to the function of the shock absorbing device, the braking means 262 also fulfils the function of the control member. In the realization shown as an electromagnetic brake, the brake blocks a vertical movement, in particular a suspension, of the coupling rocker 210 and of the first and second support rollers 30, 30' arranged thereon, when the electromagnetic brake is switched on and/or a current flows through the coil of the brake. If no current flows through the coil, the vertical movement, in particular the suspension, of the coupling rocker 210 and the first and second support rollers 30, 30' arranged on it is released. In the embodiment shown, two brake means 262, 262' are arranged on the rotary axis D of the coupling rocker 210' at opposite ends. Both braking means 262, 262' can be connected in the same way in order to enable and inhibit the movement of the coupling rocker 210 at the same time. The person skilled in the art knows, however, that even a single 262 brake is sufficient to lock the 210' coupling rocker.

FIG. 7 shows that the switching contacts S1, S2 are connected in series with the sensing devices of the support rollers and connect the coil of the hydraulic valve Y1 to a voltage source 270. Thus, when both switching contacts S1, S2 are closed, i.e. the two support rollers are in a first position where they are in contact with the underlying surface, the hydraulic valve Y1 is controlled so that it is opened in a first mode and remains open to allow and cushion a movement or springs of the coupling rocker. For example, the inventive control device could be structured in this way. The person skilled in the art knows, however, that a programmable logic controller could also be used as a control device.

If the industrial truck is tilted and one of the two support rollers on the coupling rocker is relieved, the signal is interrupted, and the hydraulic cylinder blocks the coupling rocker. Thus, the further deflection of the loaded support roller can be prevented. If both support rollers come into contact with the underlying surface again, the hydraulic valve Y1 is opened again due to the detected increased supporting force, so that the drive wheel has sufficient load again, which is required to ensure sufficient traction during starting, steering and braking.

In embodiments not shown, a fluid pressure within the hydraulic cylinder can also be changed by means of the control device or other control means can be used, such as an alignment of a support roller around the pivot axis detected by a positioning means.

The circuit shown in FIG. 7 can for example be used to control the hydraulic cylinders shown in FIGS. 5a and 5b. However, the brake fluid shown in FIG. 6 and described above can also be controlled by means of such a circuit if instead of the hydraulic valve coil, the brake fluid coil is connected in the circuit.

Figure 8:
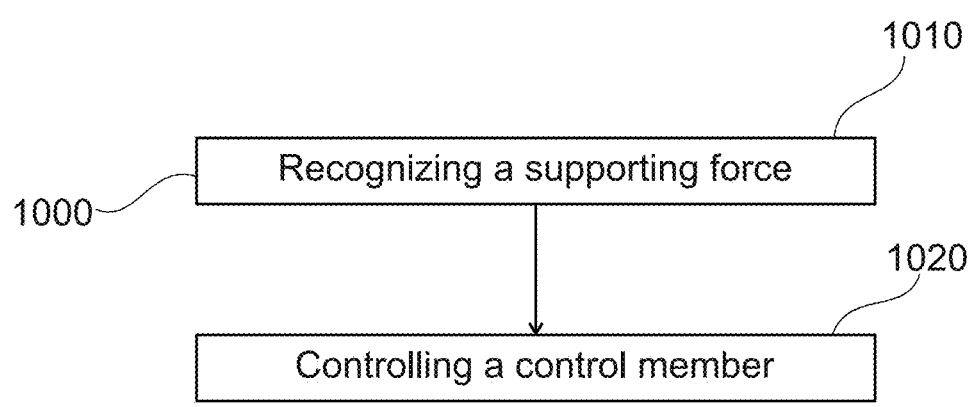
FIG. 8 is a flowchart visualizing the execution of a method for stabilizing an industrial truck according to an embodiment of the invention.

FIG. 8 shows a method 1000 for stabilizing an industrial truck according to an embodiment of the invention. The method comprises the following steps:

detecting 1010 a supporting force with which the support roller is supported on an underlying surface, wherein in the case of at least one first supporting force the support roller is in contact with the underlying surface, and in the case of at least one second supporting force the support roller is not in contact with the underlying surface; and controlling 1020 of a control member as a function of the detected supporting force, wherein a rotation of the coupling rocker 210 and/or the support roller about a rotary axis is at least partially prevented by means of the control member upon detecting the second supporting force.

The features depicted in the above description, claims and figures may be essential to the invention in its various embodiments, either individually or in any combination.

LIST OF REFERENCE NUMERALS industrial truck
3, 3', 30, 30' support roller
supporting structure
drive wheel
underlying surface
7, 70, 70' steering fork
9, 90, 90' wheel
11,110,110' rotary bearing
13a, 13b, 130a, 130b ball bearing
14, 114 pin
150a, 150b plain bearing
170 elastic means
190 sensing device
210 coupling rocker
212 bearing
214 rocker
216,216' lever
218 return device
230 connecting means
250, 250' hydraulic cylinder
252, 252' piston 254, 256, 254', 256' cylinder chamber
258 throttle element
259 non-return valve
260 control device
262 braking means
270 voltage source
1000 method for stabilizing an industrial truck
1010 detecting a position
1020 controlling a positioning cylinder
S1, S2 switching contact
Y1 hydraulic valve
S pivot axis
R rolling axis
X direction
N normal direction
D rotary axis

What is claimed is:

1. A support roller for supporting a vehicle on a ground, comprising:
   at least one bearing element connected at least indirectly to at least one support structure of the vehicle,
   at least one fork connected to the bearing element and at least one wheel rotatably mounted in the fork about a first rolling axis and configurable to be in contact with the ground,
   at least one sensing device for detecting at least one supporting force with which the wheel is supported on the ground,
   wherein the bearing element is designed in the form of at least one pivot bearing and rotation of the fork about a pivot axis running essentially perpendicular to the rolling axis is possible by means of the pivot bearing, it being possible to force the fork, rolling axis, or combination thereof, into at least one predetermined position relative to the bearing element, support structure, or combination thereof, with respect to the pivot axis by means of at least one first return device.

2. The support roller according to claim 1, wherein
   the rolling axis is perpendicular to a normal device of the ground, the support structure is formed at least in part by a body part of the vehicle, or a combination thereof;
   the rolling axis and the pivot axis intersect or are skewed relative to each other;
   a bearing axle of the roller is supported in the fork; and
   a movement, force, or combination thereof of at least one first element relative to at least one second element is detectable by means of the sensing device.

3. The support roller according to claim 2, further comprising at least one position detection device, by means of which an alignment of at least one of the following is determinable:
   the fork;
   the bearing axle;
   the wheel about the pivot axis, relative to the ground, or a combination thereof.

4. The support roller according to claim 3, wherein the sensing device, the position detection device, or a combination thereof, comprises at least one sensor means,
   a means to detect the first position, a second position of the first element relative to the second element, or a combination thereof.

5. The support roller according to claim 4, wherein the at least one sensor means comprises at least one of the following: at least one end position switch, at least one strain gauge sensor, at least one pressure sensor, at least one Hall sensor, at least one radar sensor, at least one ultrasonic sensor, at least one distance sensor, at least one echo sounder sensor, at least one acoustic sensor, at least one optical sensor, at least one electromagnetic sensor, and at least one magnetic sensor.

6. The support roller according to claim 2, wherein there is at least one of the following:
   the first element is selected from the group comprising the roller, the bearing axle, the fork, the bearing element, and at least one means of connecting the fork to the bearing element; or
   the second element is selected from the group comprising the bearing axle, the fork, the connecting means, the bearing element and the support structure.

7. The support roller according to claim 6, wherein there is at least one of the following:
   the second element is adapted to support the first element, movable along the first direction, wherein the second element is adapted to allow a movement of the first element of up to 5 mm; or
   the first element, the connecting means, or a combination thereof is forcible into a first position in a direction towards the second element by means of at least one second return device.

8. The support roller according to claim 7, wherein the first element is the fork and the second element is the bearing element, which is adapted to allow a movement of 3 mm of the first element to the second element.

9. The support roller according to claim 2, wherein at least the first return device comprises at least one elastic means, at least one compression spring, at least one helical spring, at least one pneumatic spring, at least one hydraulic spring, at least one gas pressure spring, or a combination thereof.

10. The support roller according to claim 9, wherein the sensing device is arranged according to at least one of the following:
    in regions in the bearing element; or
    on the side of the pivot bearing, facing away from the fork, the wheel, or a combination thereof.

11. The support roller of claim 2, wherein the movement, force, or combination thereof comprises at least one of the following:
    a linear movement in a first direction which is perpendicular to the rolling axis, parallel to the pivot axis, or a combination thereof; and
    a force acting between the first element and the second element, the force comprising a tensile force, a compressive force, shearing force, or a combination thereof.

12. A vehicle comprising at least one support roller according to claim 1.

13. The vehicle according to claim 12, wherein the vehicle further comprises at least one coupling rocker, wherein the coupling rocker is mechanically arranged between the support structure and the support roller and the coupling rocker comprises at least one rocker mounted rotatably about at least one axis of rotation and a lever operatively connected to the rocker, wherein the support roller is supported on the end of the lever remote from the pivot axis, the rocker, or a combination thereof, wherein the lever is configurable to be embraced by the rocker or is at least formed integrally with the rocker at least in regions, wherein the coupling rocker comprises at least one third return device by means of which the rocker, the lever, or a combination thereof is forcible into at least one third position.

14. The vehicle according to claim 13, wherein there is at least one of the following:

the coupling rocker comprises at least one damping device, wherein by means of the damping device, a movement about the axis of rotation is able to be dampened; or the vehicle is characterized by at least one control member comprising at least one control element operatively connected to the damping device, it being possible for a movement about the axis of rotation to be reduced or suppressed, by means of the control element.

15. The vehicle according to claim 14, wherein the damping device, the control member, or a combination thereof, comprises at least one cylinder with at least one piston movable within the cylinder, wherein the cylinder is connected to the lever, the support roller, the bearing element, the rocker, or a combination thereof.

16. The vehicle according to claim 15, wherein closing the control element prevents a movement about the axis of rotation and opening the control element releases a movement about the axis of rotation.

17. The vehicle according to claim 16, wherein
the cylinder comprises a single-acting cylinder and the control element comprises a throttling element adapted to control a flow rate of at least one fluid into the cylinder, or
the cylinder comprises at least two cylinder chambers connectable to one another via at least one throttle, the fluid being movable between the cylinder chambers by movement of the piston.

18. The vehicle according to claim 17, wherein
the control member comprises at least one pump means for increasing a fluid pressure in the cylinder; and
the vehicle is characterized by a plurality of support rollers, wherein the coupling rocker comprises a plurality of configurable levers arranged on the rocker.

19. The vehicle according to claim 17, wherein the at least one fluid is a hydraulic fluid, a gas, or air.

20. The vehicle according to claim 17, wherein the control element is adapted to control the throttling element in dependence on the supporting force detected by means of the sensing device in order to increase fluid pressure to avoid a reduction of the supporting force below a predetermined value.

21. The vehicle according to claim 16, wherein the control element comprises at least one control valve the movement is of the damping device, the control member, the rocker, the lever, the support roller, or a combination thereof.

22. The vehicle according to claim 15, wherein the cylinder is a hydraulic cylinder.

23. The vehicle according to claim 15, wherein the cylinder is connected via a connecting element extending at least in a radial direction with respect to the axis of rotation, and the piston is in operative connection with the support structure or the piston is in operative connection with the lever, the rocker, the support roller, the bearing element, the connecting element, or a combination thereof.

24. The method according to claim 14, wherein there is at least one of the following:
upon detection of the first supporting force, a movement about the axis of rotation is damped by means of at least one damping device, and
the damping and the prevention of the movement about the axis of rotation is carried out by means of a device which comprises, at least in part, the control member and the damping device; or
the prevention of movement about the axis of rotation is achieved by preventing movement of the damping device, at least a third return device, or a combination thereof.

25. The vehicle according to claim 14, wherein the control member comprises at least one braking means that are in operative connection with at least one of the following: the rocker, the support roller, or the supporting structure.

26. The vehicle according to claim 25, further characterized by at least one control device which is operatively connected to the control element, the damping device, or a combination thereof, the control device comprising at least one energy supply of the braking means, and wherein, when energy is delivered from the control device to the control member, a movement of the damping device, of the control member, of the rocker, of the supporting roller, or of a combination thereof about the axis of rotation is prevented and, when the energy delivery is interrupted, a movement of the damping device, of the control member, of the rocker, of the supporting roller, or of a combination thereof about the axis of rotation is enabled.

27. The vehicle according to claim 26, further comprising at least one control device which is operatively connected to the sensing device, the position detection device, the control device, the control element, or a combination thereof, wherein it is possible to influence the control element by means of the control device in such a way that the movement about the axis of rotation is reduced or prevented, if a supporting force which corresponds to a lack of contact between the supporting roller and corresponds to either the ground or the movement about the axis of rotation is at least partially released when a supporting force corresponding to an existing contact between the supporting roller and the ground is sensed by means of the sensing device.

28. The vehicle according to claim 27, wherein the control device influences the control member in dependence on a position of at least one lifting fork of the vehicle which is relative to the ground, a speed of the vehicle, a steering angle of the vehicle, or a combination thereof.

29. The vehicle according to claim 25, wherein the at least one braking means comprise an electromagnetic brake, a mechanical brake, or a brake operating in an adhesive or positive-locking manner; and the breaking means are arranged, at least in some areas, circularly around the axis of rotation of the coupling rocker.

30. The vehicle according to claim 14, wherein the movement is of the lever, the support roller, the rocker, or a combination thereof.

31. The vehicle according to claim 14, wherein the control element is enclosed by the damping device at least in certain regions, or the damping device and the control member are optionally formed in one piece.

32. A method for stabilizing a vehicle according to claim 13 using a coupling rocker and at least one support roller, comprising the steps of
detecting a supporting force with which the supporting roller is supported on a base, wherein the supporting roller is in contact with the base in the case of at least one first supporting force, and in the case of at least one second supporting force the supporting roller is not in contact with the base; and
controlling a control element as a function of the detected supporting force, wherein, when the second supporting force is detected, rotation of the coupling rocker, the supporting roller, or a combination thereof about an axis of rotation is at least partially prevented by means of the control element.

33. The vehicle according to claim 13, wherein the third return device comprises at least one torsion spring, at least one helical spring, at least one tension spring, at least one tension spring, at least one shear spring, at least one rubber-elastic element, at least one helical spring, at least one gas pressure spring, or a combination thereof.

34. The vehicle according to claim 12, wherein the vehicle is an industrial truck, a pallet truck with at least one drive wheel, a pallet truck with five-wheel chassis, or a combination thereof.

* * * * *